United States Patent Office 3,772,301
Patented Nov. 13, 1973

3,772,301
[4-SUBSTITUTED]4-(METHYLSULFINYL)
METHYLCARBOSTYRILS
Maximillian von Strandtmann, Rockaway, and David T. Connor, Parsippany, N.J., assignors to Warner-Lambert Company, Morris Plains, N.J.
No Drawing. Filed Nov. 22, 1971, Ser. No. 201,208
Int. Cl. C07d 33/60
U.S. Cl. 260—283 S          4 Claims

ABSTRACT OF THE DISCLOSURE

Compounds of the following formula:

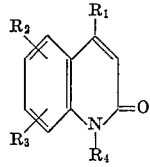

wherein $R_1$ is (methylsulfinyl)methyl, dimethoxymethyl, acetyl(methylthio)methyl, formyl or hydroxymethyl; $R_2$ and $R_3$ are hydrogen, halogen, lower alkyl, aralkyl, aryl, lower alkoxy, acylamino, hydroxy or taken together $R_2$ and $R_3$ form another aromatic ring, and $R_4$ is hydrogen or methyl, are described. The compounds of this invention are useful for the treatment of allergic conditions.

The above compounds, when $R_1$ is (methylsulfinyl)methyl, are prepared as follows:

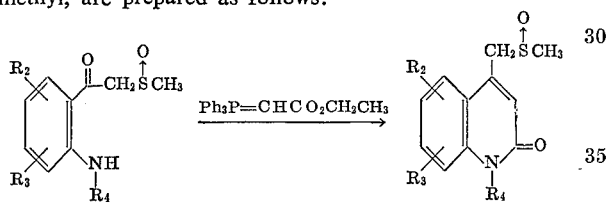

When $R_1$ is other than (methylsulfinyl)methyl, they are prepared by treating the (methylsulfinyl)methyl substituted carbostyrils with acetic anhydride as set forth in the body of the specification.

These compounds are useful in providing symptomatic relief of allergic conditions such as bronchial asthma.

The present invention is concerned with 4-substituted carbostyrils having the following structural formula:

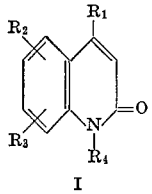

I wherein $R_1$ is (methylsulfinyl)methyl, dimethoxymethyl, acetyl (methylthio)methyl, formyl or hydroxymethyl; $R_2$ and $R_3$ are hydrogen, halogen, an alkyl group having 1 to 4 carbon atoms, aralkyl, aryl, an alkoxy group having 1 to 4 carbon atoms, acylamino, hydroxy or taken together $R_2$ and $R_3$ form another aromatic ring, and $R_4$ is hydrogen or methyl.

The above compounds exhibit anti-allergic activity in several mammalian species. For example, using test procedures described by I. Mota, Life Sciences, 7, 465 (1963); Z. Ovary and O. Bier, Proc. Soc. Exptl. Biol. Med., 81, 584 (1952) utilizing sensitized rats as the host these compounds administered at a dose of 100 mg./kg. intra-parenterally have been observed to suppress allergic manifestations.

Generally speaking, these compounds are indicated in providing symptomatic relief in allergic manifestations such as asthma. A dose of about 100 mg./kg. is prescribed to provide such relief.

In order to use these compounds they are formulated with pharmaceutical excipients such as sesame oil, peanut oil or water for injection into dosage forms suitable for parenteral administration.

According to the present invention the above compounds wherein $R_1$ is (methylsulfinyl)methyl are prepared from the corresponding o-aminomethylsulfinyl-acetophenones by the following reaction scheme:

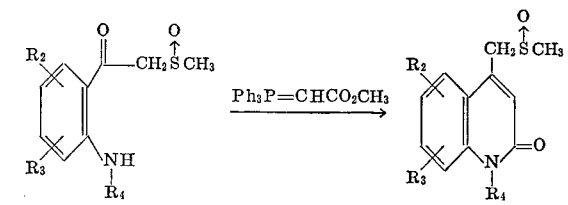

The 4-[(methylsulfinyl)methyl]carbostyrils are converted to 4-formylcarbostyrils by the reaction sequence shown below:

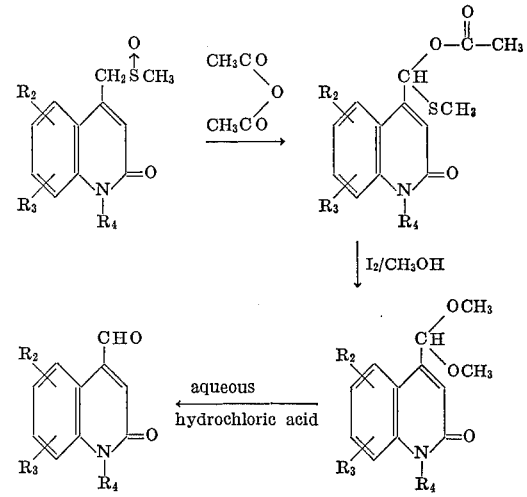

The 4-formylcarbostyrils can be used as synthetic intermediates in an analogous manner to the 4-substituted coumarins described in our copending application filed Oct. 22, 1971 (our Docket No. 2100.862) (U.S. Ser. No. 191,830, filed Oct. 22, 1971). An example is the reduction of the 4-formyl group to the 4-hydroxymethyl group with sodium borohydride.

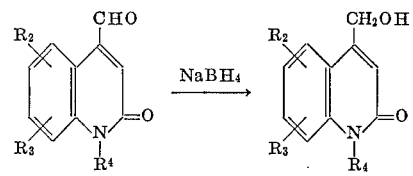

The following examples are included in order further to illustrate the invention.

EXAMPLE 1

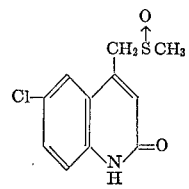

6-chloro-4[(methylsulfinyl)methyl]carbostyril 6-chloro - 2 - amino-1[(methylsulfinyl)acetyl]benzene (23.1 g., 0.1 m) and (carbethoxymethylene)triphenylphosphorane (69.6 g., 0.2 m) in dioxane (500 ml.) were refluxed for 48 hours. The reaction mixture was cooled and the product was filtered. Recrystallization from DMF gave a white crystalline solid (15 g., 60%), M.P. 275°–276°.

*Analysis.*—Calcd. for $C_{11}H_{10}ClNO_2S$ (percent): C, 51.67; H, 3.94; N, 5.48; Cl, 13.86; S, 12.54. Found (percent): C, 51.60; H, 4.19; N, 5.46; Cl, 13.90; S, 12.46.

EXAMPLE 2

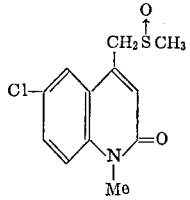

6-chloro-1-methyl-4-[(methylsulfinyl)methyl]carbostyril

Prepared by the general method described above. Recrystallization from ethanol gave yellow crystals (31% yield), M.P. 223°–224°.

*Analysis.*—Calcd. for $C_{12}H_{12}ClNO_2S$ (percent): C, 53.43; H, 4.48; N, 5.19; Cl, 13.14; S, 11.89. Found (percent): C, 53.63; H, 4.51; N, 5.17; Cl, 13.07; S, 11.85.

EXAMPLE 3

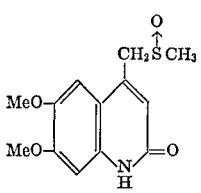

6,7-dimethoxy-4-[(methylsulfinyl)methyl]carbostyril

Prepared by the general method outlined above with a reflux time of 68 hours. Recrystallization from DMF gave a crystalline product in 0.6% yield, M.P. 261°–263°.

*Analysis.*—Calcd. for $C_{13}H_{15}NO_4S$ (percent): C, 55.50; H, 5.37; N, 4.98; S, 11.40. Found (percent): C, 55.50; H, 5.50; N, 5.09; S, 11.38.

EXAMPLE 4

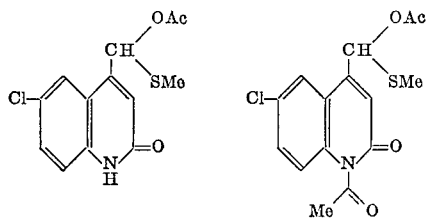

6 - chloro-4-[hydroxy(methylthio)methyl]carbostyril acetate and 6-chloro - 1 - acetyl-4-[hydroxy(methylthio)methyl]carbostyril acetate 6 - chloro-4-[(methylsulfinyl)methyl]carbostyril (14.6 g., .05 m) in acetic anhydride (600 ml.) was refluxed for 6 hours. The substrate gradually dissolved over the first 3 hours to give a deep purple solution. The solvent was removed under reduced pressure and the residue was recrystallized from methanol to give 6-chloro-4-[hydroxymethylthio)mehyl]carbostyril acetate (5.21 g., 32%) as white crystals, M.P. 243°–244°.

*Analysis.*—Calcd. for $C_{13}H_{12}ClNO_3S$ (percent): C, 52.44; H, 4.06; N, 4.70; S, 10.77. Found (percent): C, 52.36; H, 4.16; N, 4.48; S, 10.58.

A second crop crystallized out to give 6 - chloro-1-acetyl-4-[hydroxy(methylthio)methyl]carbostyril acetate (7.0 g., 39%) as white crystals, M.P. 103°–104°.

*Analysis.*—Calcd. for $C_{15}H_{14}ClNO_4S$ (percent): C, 52.94; H, 4.12; N, 4.12; S, 9.41. Found (percent): C, 52.98; H, 4.19; N, 4.16; S, 10.12.

EXAMPLE 5

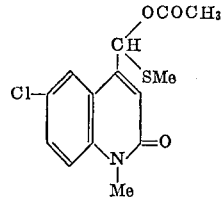

6-chloro-1-methyl-4-[hydroxymethylthio]carbostyril acetate 6-chloro - 1 - methyl-4-[methylsulfinyl)methyl]carbostyril (340 mg., 0.013 m) in acetic anhydride (20 ml.) was refluxed for 4 hours. The solvent was removed under reduced pressure to give a brown gum which crystallized on standing. Recrystallization from methanol gave a crystalline solid (0.340 g., 87%), M.P. 150°–151°.

*Analysis.*—Calcd. for $C_{14}H_{14}ClNO_3S$ (percent): C, 53.93; H, 4.53; N, 4.49; S, 10.28. Found (percent): C, 54.08; H, 4.58; N, 4.63; S, 10.37.

EXAMPLE 6

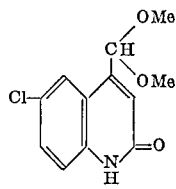

6-chloro-4-(dimethoxymethyl)carbostyril 6-chloro-4-[hydroxymethylthio]carbostyril acetate (1.2 g., 0.003 m) and iodine (0.5 g., 0.043 m) in methanol (50 ml.) were refluxed for 4 hours. The methanol was removed under reduced pressure and the brown residue was dissolved in chloroform. The chloroform solution was extracted with saturated sodium thiosulfate solution (3× 30 ml.), washed with water, dried over $MgSO_4$ and evaporated to give a yellow solid. Recrystallization from methanol gave white crystals (0.83 g., 83%), M.P. 212°–215°.

*Analysis.*—Calcd. for $C_{12}H_{12}ClNO_3$ (percent): C, 56.82; H, 4.77; N, 5.52; Cl, 13.98. Found (percent): C, 57.07; H, 4.84; N, 5.69; Cl, 13.84.

EXAMPLE 7

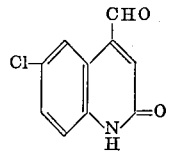

6-chloro-4-formylcarbostyril

A suspension of 6-chloro-4-(dimethoxymethyl)carbostyril (3 g., 0.012 m) in 20% hydrochloric acid (100 ml.) was refluxed with stirring for 3 hours. The crude product was filtered off. Recrystallization from DMF gave yellow crystals (2.03 g., 80%), M.P. 304°–305°.

*Analysis.*—Calcd. for $C_{10}H_6ClNO_2$ (percent): C, 57.85; H, 2.91; N, 6.75; Cl, 17.08. Found (percent): C, 58.10; H, 2.95; N, 6.64; Cl, 17.05.

EXAMPLE 8

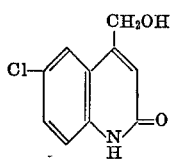

6-chloro-4-(hydroxymethyl)carbostyril

Sodium borohydride (2.0 g., 0.052 m) was added to a suspension of 6-chloro-4-formylcarbostyril (3.0 g., 0.015 m) in 20% aqeuous dioxane (50 ml.) at room temperature. The reaction mixture was stirred for 2 hours and diluted with water. The precipitated solid was filtered, washed with water and methanol, and dried. Recrystallization from DMF gave yellow crystals (2.11 g., 70%), M.P. 325°–327°.

*Analysis.*—Calcd. for $C_{10}H_8ClNO_2$ (percent): C, 57.30; H, 3.85; N, 6.68; Cl, 16.91. Found (percent): C, 57.53; H, 3.82; N, 6.65; Cl, 16.61.

We claim:
1. A compound of the formula:

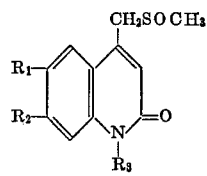

wherein $R_1$ and $R_2$ are hydrogen, halogen or an alkoxy group having 1 to 4 carbon atoms, and $R_3$ is hydrogen or methyl.

2. A compound according to claim 1 which is 6-chloro-4[(methylsulfinyl)methyl]carbostyril.

3. A compound according to claim 1 which is 6-chloro-1-methyl-4-[(methylsulfinyl)methyl]carbostyril.

4. A compound according to claim 1 which is 6,7-dimethoxy-4[(methylsulfinyl)methyl]carbostyril.

References Cited

UNITED STATES PATENTS 3,438,992   4/1969   Shen _____ 260—283 S

OTHER REFERENCES

Takahashi et al.: Chem. Abstr. vol. 72, col. 90182z (1970).

Chudgar et al.: Chem. Abstr. vol. 75, col. 20150a (1971).

Takahashi et al.: Chem. Abstr., vol. 67, col. 64157x (1967).

DONALD G. DAUS, Primary Examiner

U.S. Cl. X.R.

260—283.51, 287 R, 289 R, 340.3, 571, 577; 424—258